United States Patent
Zhou et al.

(10) Patent No.: US 11,414,590 B2
(45) Date of Patent: *Aug. 16, 2022

(54) COMPOSITIONS FOR DELAYED ACID GENERATION FOR HIGH TEMPERATURE APPLICATIONS AND METHODS OF MAKING AND USING SAME

(71) Applicant: Halliburton Energy Services, Inc., Houston, TX (US)

(72) Inventors: Hui Zhou, Houston, TX (US); Jay Paul Deville, Houston, TX (US); Eliane Padua Oliveira, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/380,964

(22) Filed: Jul. 20, 2021

(65) Prior Publication Data

US 2021/0371723 A1    Dec. 2, 2021

Related U.S. Application Data

(63) Continuation of application No. 16/885,730, filed on May 28, 2020, now Pat. No. 11,098,237.

(51) Int. Cl.
  *E21B 43/16*    (2006.01)
  *C09K 8/528*    (2006.01)
  *C09K 8/524*    (2006.01)
  *C09K 8/18*     (2006.01)

(52) U.S. Cl.
  CPC ............... *C09K 8/528* (2013.01); *C09K 8/18* (2013.01); *C09K 8/524* (2013.01); *E21B 43/162* (2013.01)

(58) Field of Classification Search
  CPC .......... C09K 8/528; C09K 8/18; C09K 8/524; E21B 43/162
  See application file for complete search history.

(56) References Cited

U.S. PATENT DOCUMENTS

| | | | |
|---|---|---|---|
| 3,953,340 A | 4/1976 | Templeton et al. | |
| 5,813,466 A * | 9/1998 | Harris | C09K 8/12 507/216 |
| 6,192,986 B1 | 2/2001 | Urlwin-Smith | |
| 7,431,088 B2 | 10/2008 | Moorehead et al. | |
| 7,608,567 B2 * | 10/2009 | Saini | C09K 8/94 507/221 |

(Continued)

OTHER PUBLICATIONS

Sarel, Shalom et al, "Rates of Alkaline Hydrolysis of a Series of Primary and Secondary Alkyl Acetates," Journal of the American Chemical Society, 1956, pp. 5420-5423, vol. 78.

(Continued)

*Primary Examiner* — Silvana C Runyan
(74) *Attorney, Agent, or Firm* — Conley Rose, P.C.; Rodney B. Carroll

(57) ABSTRACT

A method of servicing a wellbore penetrating a subterranean formation, comprising placing into the wellbore a wellbore servicing fluid comprising a sterically-hindered ester having a general formula $R^1COOR^2$ and an aqueous fluid, wherein $R^1$, $R^2$ or both have A-values greater than about 1.76 kcal/mol.

20 Claims, 2 Drawing Sheets

(56) References Cited

U.S. PATENT DOCUMENTS

| | | | |
|---|---|---|---|
| 7,833,944 B2* | 11/2010 | Munoz | C09K 8/035 |
| | | | 166/305.1 |
| 8,881,823 B2 | 11/2014 | Collins et al. | |
| 11,098,237 B1 | 8/2021 | Zhou | |
| 2006/0278389 A1 | 12/2006 | Ayoub et al. | |
| 2010/0099587 A1* | 4/2010 | Welton | C09K 8/685 |
| | | | 507/260 |
| 2010/0252267 A1 | 10/2010 | Harris et al. | |
| 2013/0133886 A1 | 5/2013 | Quintero | |
| 2014/0142003 A1 | 5/2014 | Miller et al. | |
| 2014/0303047 A1 | 10/2014 | McDaniel et al. | |
| 2014/0318788 A1 | 10/2014 | Agrawal et al. | |
| 2015/0337195 A1 | 11/2015 | Lu | |
| 2015/0361328 A1 | 12/2015 | Almutairi | |
| 2017/0327735 A1 | 11/2017 | Belakshe et al. | |

OTHER PUBLICATIONS

Electronic Filing Acknowledgment, Specification and Drawings for International Application No. PCT/US2020/035114, entitled "Compositions for Delayed Acid Generation for High Temperature Applications and Methods of Making and Using Same," filed May 29, 2020, 35 pages.

Foreign Communication from Related Application—International Search Report and Written Opinion of the Internationa Searching Authority, International Application No. PCT/US2020/035114, dated Feb. 26, 2021, 9 pages.

* cited by examiner

COMPOSITIONS FOR DELAYED ACID GENERATION FOR HIGH TEMPERATURE APPLICATIONS AND METHODS OF MAKING AND USING SAME

CROSS REFERENCE TO RELATED APPLICATIONS

This application is a continuation of and claims priority to U.S. patent application Ser. No. 16/885,730 filed on May 28, 2020, now U.S. Pat. No. 11,098,237 B1, and entitled "Compositions for Delayed Acid Generation for High Temperature Applications and Methods of Making and Using Same," which is incorporated by reference herein in its entirety.

BACKGROUND

This disclosure relates to methods of servicing a wellbore. More specifically, it relates to methods of treating a wellbore penetrating a subterranean formation to remove filter cakes.

Natural resources such as gas, oil, and water residing in a subterranean formation or zone are usually recovered by drilling a wellbore down to the subterranean formation while circulating a drilling fluid, also referred to as drilling mud, in the wellbore. The drilling fluid is usually circulated downward through an interior of a drill pipe and upward through an annulus, which is located between the exterior of the drill pipe and the interior wall of the wellbore. The presence of such a drilling fluid aids in the drilling operation, for example, by removing cuttings from the wellbore (e.g., by suspending and releasing cuttings returned to the surface), controlling pressures within the subterranean formation, sealing permeable and/or semi-permeable portions of the subterranean formation, stabilizing the subterranean formation, cooling and lubricating the drilling apparatus, and facilitating completion operations. As it circulates through the wellbore during a drilling operation, the drilling fluid is deposited on the surfaces of the growing wellbore in a thin, low-permeability layer known as a filter cake, thus inhibiting the loss of mud and/or mud filtrate or other wellbore fluids to the formation during the drilling and/or other servicing operations.

Filter cakes and other debris left in the wellbore can have an adverse effect on several aspects of a wellbore's completion and production stages, from inhibiting the performance of downhole tools to inducing formation damage and plugging production tubing. Prior to production, the filter cake can be removed to allow the unimpeded flow of natural resources to the wellbore.

When strong acids, such as hydrochloric acid, or low pH solutions are used for the removal of the filter cake, there is a corrosion risk to wellbore equipment, (e.g., safety valves, casings, production tubing, mandrels, pipes, separators, pumps, etc.). The use of strong acids for filter cake removal can also lead to the formation of "wormholes," which occurs when the strong acid attacks the filter cake in localized spots and creates holes in the filter cake, as opposed to removing the entire filter cake. One way to circumvent this problem would be by using high pH solutions (e.g., pH greater than 7) for the removal of filter cakes. However, filter cake breaking agents are usually ineffective in high pH environments.

Thus, an ongoing need exists for more effective compositions and methods for removing filter cakes while minimizing damage to the formation or the wellbore in subterranean formations.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION

Figure 1:
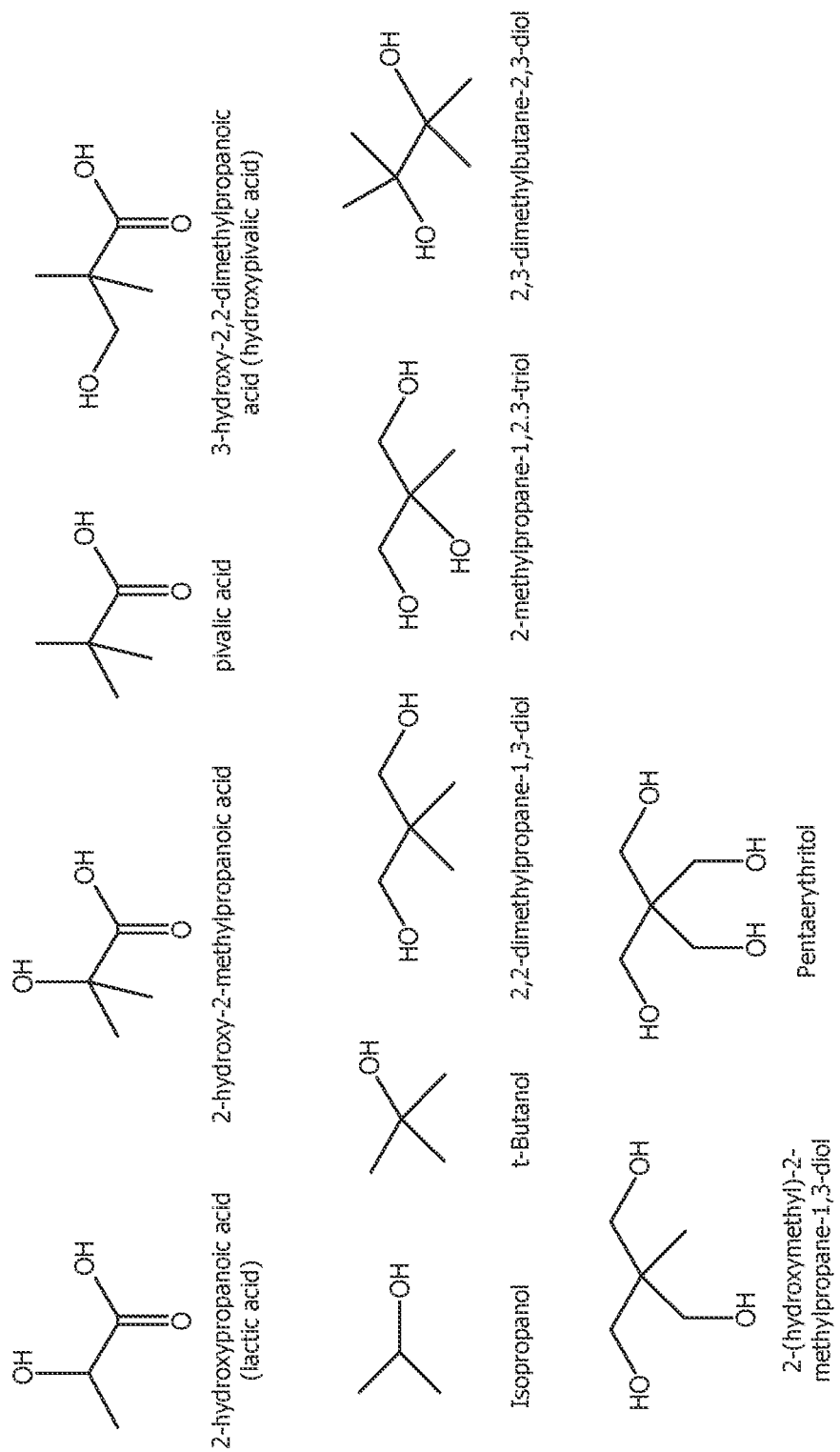
FIG. 1 depicts chemical structures of sterically-hindered carboxylic acids and sterically-hindered alcohols.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein is a method of servicing a wellbore penetrating a subterranean formation. The method can include placing a wellbore servicing fluid into the wellbore. In an aspect, the wellbore servicing fluid includes a sterically-hindered ester having a general formula $R^1COOR^2$ and an aqueous fluid, wherein $R^1$, $R^2$, or both have A-values greater than about 1.76 kcal/mol, alternatively greater than about 1.78 kcal/mol or alternatively greater than about 2 kcal/mol.

"A-Values" are a numerical way of rating the bulkiness of substituents on a cyclohexane ring. The "A-Value" represents the difference in energy (in kcal/mol) between a cyclohexane conformation bearing a group in an equatorial position and a cyclohexane conformation bearing the group in an axial position. The greater the "A-value," the higher the energetic preference for the equatorial position of the cyclohexane ring, and the more "bulky" the group is considered.

Steric effects are nonbonding interactions that influence the shape and reactivity (e.g., hydrolyzing) of ions and molecules. In one or more aspects, esters of the present disclosure are sterically hindered molecules. Steric hindrance refers to the finding that at a given atom in a molecule, there can be a congestion caused by the physical.

presence of the surrounding atoms. Steric hindrance may slow down or prevent reactions at the sterically-hindered atom.

In an aspect, the sterically-hindered ester includes methyl hydroxypivalate (MHP), ethyl hydroxypivalate, isopropyl hydroxypivalate, isobutyl hydroxypivalate, t-butyl hydroxypivalate, isopropyl lactate, isobutyl lactate, t-butyl lactate, methyl 2-hydroxy-2-methylpropanoat , ethyl 2-hydroxy-2-methylpropanoate, isopropyl 2-hydroxy-2-methylpropanoate, isobutyl 2-hydroxy-2-methylpropanoate, t-butyl 2-hydroxy-2-methylpropanoate, hydroxypivalyl hydroxypivalate, or combinations thereof. The sterically-hindered ester can be present in the wellbore servicing fluid in an amount of from about 0.01 wt. % to about 50 wt. %, based on a total weight of the wellbore servicing fluid, alternatively from about 0.05 wt. % to about 40 wt. % or alternatively from about 0.1 wt. % to about 30 wt. %.

In an aspect, the sterically-hindered ester in the present disclosure hydrolyzes to form a carboxylic acid and an alcohol. The carboxylic acid can have a general formula $R^1COOH$ and the alcohol can have a general formula $R^2OH$, wherein (i) the carboxylic acid is a sterically-hindered carboxylic acid, (ii) the alcohol is a sterically-hindered alcohol, or both (i) and (ii). Without being limited by theory, the sterically-hindered ester is a product of a reaction between a carboxylic acid and an alcohol, where the carboxylic acid, the alcohol, or both are sterically hindered.

In one or more aspects, the sterically-hindered carboxylic acid has the general formula $R^1COOH$, where $R^1$ is —$CR^3R^4R^5$, at least one of $R^3$, $R^4$, and $R^5$ is not hydrogen and at least one of $R^3$, $R^4$, and $R^5$ can be independently selected from a group consisting of an organyl group having from about 1 to about 10 carbon atoms, a hydroxyl group, halogen, hydrogen, and an alkoxyl group. The general formula of a sterically-hindered carboxylic acid suitable for use in the present disclosure is a compound having Structure I:

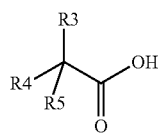

Structure I

Examples of sterically-hindered carboxylic acids suitable for use in the present disclosure include, but are not limited to lactic acid, 2-hydroxy-2-methylpropanoic acid, pivalic acid, 3-hydroxy-2,2-dimethylpropanoic acid (hydroxypivalic acid), and combinations thereof, as depicted in FIG. 1.

In one or more aspects, the sterically-hindered alcohol has the general formula $R^2OH$, where $R^2$ is —$CR^6R^7R^8$ or —$CH_2CR^6R^7R^8$. In an aspect, at least one of $R^6$, $R^7$, and $R^8$ is not hydrogen, and $R^6$, $R^7$, and $R^8$ can be independently selected from a group consisting of an organyl group having from about 1 to about 10 carbon atoms, a hydroxyl group, halogen, hydrogen, and an alkoxyl group. The general formula of a sterically-hindered alcohol suitable for use in the present disclosure is a compound having Structure IIa or Structure IIb:

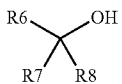

Structure IIa

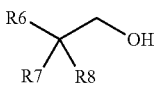

Structure IIb

FIG. 1 depicts structures of some examples of sterically-hindered alcohols suitable for use in the present disclosure. Nonlimiting examples of sterically-hindered alcohols suitable for use in the present disclosure include, but are not limited to isopropanol, isobutanol, t-butanol, neopentyl alcohol, 2,2-dimethylpropane-1,3-diol, 2-methylpropane-1,2,3-triol, 2,3-dimethylbutane-2,3-diol, 2-(hydroxymethyl)-2-methylpropane-1,3-diol, pentaerythritol, and combinations thereof.

In an aspect, a wellbore servicing fluid including a sterically-hindered ester of the type disclosed herein is used in a wellbore servicing operation, more specifically, for removing (e.g., dissolving) filter cakes in a wellbore. A wellbore servicing fluid of the type disclosed herein (i.e., including a sterically-hindered ester) can also be referred to as a breaker fluid.

In an aspect, a method of the present disclosure includes removal of a filter cake from the surface of a formation utilizing a breaker fluid of the present disclosure. A filter cake can be formed by residue deposited on a wellbore wall when a fluid, such as a drilling fluid, is forced against the wellbore wall under a pressure (e.g., a downhole pressure during a drilling operation). The drilling fluid can be a water-based fluid or an oil-based fluid. A filter cake can include polymeric materials, a bridging agent, drill solids (e.g., aluminosilicates, clays), metal ions, or combinations thereof. Nonlimiting examples of metal ions that may be found in a filter cake include $Ca^{2+}$ (e.g., in a form of calcium carbonate), $Mg^{2+}$, $Ba^{2+}$, $Sr^{2+}$, $Fe^{2+}$, $Fe^{3+}$, $Cu^{2+}$, $Ag^+$, $Ni^{2+}$, $Cr^{3+}$, and the like.

In an aspect, the method further includes placing into the wellbore a wellbore servicing fluid including a sterically-hindered ester of the type described herein and allowing the sterically-hindered ester to hydrolyze to form a carboxylic acid and an alcohol, wherein the carboxylic acid is allowed to contact a filter cake in the wellbore for a time period sufficient to remove all or a portion of the filter cake. Without being limited by theory, the carboxylic acid generated by the sterically-hindered ester can react with one or more components in a filter cake and thus remove (e.g., dissolve) all or a portion of the filter cake. Therefore, a wellbore servicing fluid of the type disclosed herein can be placed proximate the filter cake before production of formation fluid from the wellbore to remove all or a portion of the filter cake. After placing the wellbore servicing fluid, equipment and/or tools (e.g., drillstring) may need to be retrieved (e.g., pulled out) from the wellbore, so that the equipment and/or tools will not be damaged by the carboxylic acid. Allowing time for retrieval of equipment and/or tools from wellbores with relatively long lengths and complexity is one of many factors that may be facilitated by utilization of a time-delayed carboxylic acid generation.

In an aspect, hydrolysis of the sterically-hindered ester to form carboxylic acid and removal of a portion or all of a filter cake may exhibit some user and/or process desired delay period. As used herein, the term "delay period" refers to the period of time from when the sterically-hindered ester is introduced into an environment (e.g., a downhole environment) until the sterically-hindered ester has hydrolyzed to form the carboxylic acid and removed (e.g., dissolved) at least a portion of the filter cake so that a wellbore servicing fluid can flow into the formation, as will be disclosed herein. For example, the delay period may be equal to or greater than about 1 hour, alternatively equal to or greater than about 4 hours, alternatively equal to or greater than about 6 hours, alternatively equal to or greater than about 12 hours, alternatively equal to or greater than about 18 hours, alternatively equal to or greater than about 24 hours, alternatively equal to or greater than about 36 hours, alternatively equal to or greater than about 48 hours, alternatively equal to or greater than about 72 hours, or alternatively equal to or greater than about 96 hours. In an aspect, hydrolysis starts after the sterically-hindered ester is introduced into an environment (e.g., a downhole environment). Hydrolysis of equal to or greater than about 30% of the molar amount of the sterically-hindered ester introduced to the wellbore may occur after the delay period as disclosed, alternatively equal to or greater than about 50% or alternatively equal to or greater than about 60%. In an aspect, the delay period disclosed herein is sufficient to allow the wellbore servicing fluid of the type disclosed herein to be placed downhole proximate a destination (e.g., a filter cake), and allows time to retrieve (e.g., pull out) equipment and/or tools from the wellbore.

The sterically-hindered esters of the present disclosure may be characterized by a variability in the delay period that is a function of the extent of steric hindrance of a reactive atom. As such, in an aspect, a suitable sterically-hindered ester may be selected for inclusion in the wellbore servicing fluid such that the sterically-hindered ester exhibits a user and/or process-desired delay period. As will be appreciated by one of skill in the art viewing this disclosure, the delay period may be dependent upon the sterically-hindered ester utilized, the temperature of the environment (e.g., a downhole environment), the presence or absence of any additional components, or combinations thereof, as will be disclosed herein below.

In an aspect, hydrolysis of the sterically-hindered ester is influenced by a temperature of a downhole environment (e.g., a bottom hole static temperature (BHST) for a given wellbore). For example, at higher temperatures, a hydrolysis rate of a given sterically-hindered ester to generate a carboxylic acid is faster resulting in a shorter delay period. Bottom hole static temperature (BHST) is an undisturbed temperature at the bottom of a wellbore. After fluid circulation stops and after the wellbore is shut in (e.g., by closing a fluid isolation valve), temperature n the wellbore may approach the BHST after about 24 to 36 hours, depending on conditions of the wellbore. A sterically-hindered ester of the present disclosure can have a delay period of the ranges disclosed herein at a BHST in a range of from about 200° F. to about 400° F., alternatively from about 200° F. to about 375° F. or alternatively from about 200° F. to about 350° F.

The wellbore servicing fluid can include an aqueous fluid. The aqueous fluid can be selected from a group consisting of freshwater, seawater, saltwater, brine (e.g., underground natural brine, formulated brine, etc.), and combinations thereof. Generally, the aqueous fluid may be from any source, provided that it does not contain an amount of components that may undesirably affect the other components in the wellbore servicing fluid. The aqueous fluid can be present in the wellbore servicing fluid in an amount effective to provide a slurry having desired (e.g., job or service specific) rheological properties. The aqueous fluid can be present in the wellbore servicing fluid in an amount of from about 50 wt. % to about 95 wt. % based on the total weight of the wellbore servicing fluid, alternatively from about 55 wt. % to about 95 wt. % or alternatively from about 55 wt. % to about 93 wt. %.

In an aspect, the aqueous fluid includes brine. The brine can be a natural brine, seawater or may have been produced by dissolving one or more salts in water. The brine can be saturated or nearly saturated with salts. Representative salts include the chloride, bromide, acetate, and formate salts of potassium, sodium, calcium, magnesium, and zinc. Examples of brines suitable for use in this disclosure include without limitation saturated or partially saturated aqueous solutions including halide-containing salts, alkali metal salts, alkaline metal salts, formate-containing compounds, sodium bromide (NaBr), calcium chloride ($CaCl_2$), calcium bromide ($CaBr_2$), sodium chloride (NaCl), zinc bromide ($ZnBr_2$), sodium formate, cesium formate, potassium formate, and combinations thereof.

The salt can be present in the brine in an amount of from about 1 wt. % to about 70 wt. % based on a total weight of the brine, alternatively from about 2 wt. % to about 60 wt. % or alternatively from about 3 wt. % to about 50 wt. %.

The choice of brine may be dictated by a variety of factors such as formation condition and a desired density of the wellbore servicing fluid. The brine can have a density of from about 8.5 pounds per gallon (ppg) to about 15.1 ppg, alternatively from about 8.5 ppg to about 14.5 ppg or alternatively form about 9.5 ppg to about 13.5 ppg.

In an aspect, the wellbore servicing fluid further includes an emulsifier. Herein an emulsifier refers to a substance which stabilizes an emulsion. An emulsion refers to a mixture of two immiscible liquids of which one is in dispersed form, referred to as internal phase, and the other is in the continuous form, referred to as the external, bulk or continuous phase.

Any emulsifier compatible with components of the wellbore servicing fluid is suitable for use in the present disclosure. Nonlimiting examples of emulsifiers that may be employed in the present disclosure include any surfactant suitable for forming emulsions such as anionic surfactants (e.g., alkyl sulfates, sulfonates, amidoamines, and carboxylates) or non-ionic surfactants (e.g., ethoxylated alcohols, ethylene oxide/propylene oxide copolymers). The emulsifier can include sodium phosphates, monoglycerides, diglycerides, sodium stearoyl lactylate, diacetyl tartaric acid esters of monoglycerides and diglycerides, emulsifying wax, polysorbate 20, polysorbate 40, polysorbate 60, polysorbate 80, ceteareth 20, ethoxylated alcohols, alkyl polyglycoside, dodecylbenzenesulfonate, ethylene oxide/propylene oxide copolymers (EO/PO copolymers), or combinations thereof In an aspect the emulsifier is present in the wellbore servicing fluid in an amount of from about 0.1 vol. % to about 5 vol. %, alternatively from about 0.1 vol. % to about 4 vol. %, alternatively from about 0.5 vol. % to about 4 vol. %, based on the total volume of the wellbore servicing fluid.

In an aspect, the wellbore servicing fluid optionally includes a viscosifier. The viscosifier can include polymeric additives, hydroxyethyl cellulose (HEC), modified cellulose and derivatives thereof, biopolymers such as guar, guar gum, starch, xanthan, and viscoelastic surfactants (VES), or combinations thereof. The viscosifier can be present in the wellbore servicing fluid in an amount of from about 0 wt. % to about 10 wt. %, alternatively from about 0.1 wt. % to about 8 wt. % or alternatively from about 0.2 wt. % to about 6 wt. %, based on the total weight of the wellbore servicing fluid.

In an aspect, the wellbore servicing fluid further includes one or more additives. The one or more additives can be included in the wellbore servicing fluid for improving or changing the properties thereof. The one or more additives can include an acid, a base, a defoamer, an expansion agent, a salt, a corrosion inhibitor, a mutual solvent, a conventional breaking agent, a relative permeability modifier, lime, a gelling agent, a crosslinker, a fluid loss control additive, a flocculant, a water softener, a proppant, an oxidation inhibitor, a thinner, a scavenger, a gas scavenger, a lubricant, a friction reducer, a bridging agent, a vitrified shale, a thixotropic agent, a dispersing agent, a weight reducing additive (e.g., hollow glass or ceramic beads), a heavyweight additive, a surfactant, a scale inhibitor, a clay, a clay control agent, a clay stabilizer, a dispersant, a silicate-control agent, a biocide, a biostatic agent, a storage stabilizer, a filtration control additive, a suspending agent, a foaming agent, latex emulsions, a formation conditioning agent, elastomers, gas/fluid absorbing materials, resins, superabsorbers, mechanical property modifying additives (i.e. carbon fibers, glass fibers, metal fibers, minerals fibers, polymeric elastomers, latexes, etc.), inert particulates, or combinations thereof. The one or more additives can be present in the wellbore servicing fluid in a total amount of from about 0.1 wt. % to about 10 wt. % based on the total weight of the wellbore servicing fluid, alternatively from about 0.1 wt. % to about 9 wt. % or alternatively from about 1 wt. % to about 8 wt. %.

In an aspect, the wellbore servicing fluid has a breakthrough time of equal to or greater than about 12 hours, alternatively equal to or greater than about 14 hours or alternatively equal to or greater than about 16 hours, to break through a filter cake formed by a water-based fluid in a breakthrough test. In an aspect, the wellbore servicing fluid has a breakthrough time of equal to or greater than about 4 hours, alternatively equal to or greater than about 6 hours or alternatively equal to or greater than about 8 hours, to break through a filter cake formed by an oil-based fluid in a breakthrough test.

In an aspect, the wellbore servicing fluid has a density of from about 8.5 pounds per gallon (ppg) to about 16 ppg, alternatively from about 8.5 ppg to about 14 ppg or alternativ e y from about 8.5 ppg to about 12.5 ppg.

Prior to the placing, the wellbore servicing fluid can have a pH in a range of from about 7 to about 10, alternatively from about 7 to about 9.5 or alternatively from about 7 to about 9. The pH of the wellbore servicing fluid can decrease as the sterically-hindered ester hydrolyzes to form the carboxylic acid in the wellbore.

A wellbore servicing fluid of the type disclosed herein can be prepared using any suitable method. In an aspect, the method includes placing a mixture of components (e.g., a sterically-hindered ester, an aqueous fluid, one or more additives, etc.) of the wellbore servicing fluid into a suitable container (e.g., a mixer, a blender) and blending the mixture until the mixture becomes a pumpable fluid (e.g., a homogeneous fluid).

The container can be any container that is compatible with the mixture and has sufficient space for the mixture. In an aspect, the wellbore servicing fluid is prepared at the wellsite. The sterically-hindered ester can be liquid or solid at room temperature. The sterically-hindered ester and solid composition (e.g., one or more additives) of the wellbore servicing fluid can be transported to the wellsite and combined (e.g., mixed/blended) with an aqueous fluid (e.g., a formulated brine) located proximate the wellsite to form the wellbore servicing fluid. The aqueous fluid can be conveyed from a source to the wellsite or be available at the wellsite prior to the combining. The sterically-hindered ester and the solid composition of the wellbore servicing fluid can be prepared at a location remote from the wellsite and transported to the wellsite, and, if necessary, stored at an on-site location. When it is desirable to prepare the wellbore servicing fluid at the wellsite, the sterically-hindered ester and the solid composition of the wellbore servicing fluid along with the aqueous fluid can be added into a container (e.g. a blender tub, for example mounted on a trailer), and the mixture is then blended until the mixture becomes a pumpable fluid (e.g., a homogeneous fluid). Additives (e.g., the sterically-hindered ester, optional other additives) can be added to the wellbore servicing fluid during preparation thereof (e.g., during blending) and/or on-the-fly (e.g., in real time or on-location) by addition to (e.g., injection into) the wellbore servicing fluid when being pumped into the wellbore.

The wellbore servicing fluid of the type disclosed herein may be used for the removal of filter cakes in any suitable stage of a wellbore's life, such as for example, during a drilling operation, completion operation, etc.

In an aspect, a method of servicing a wellbore penetrating a subterranean formation can include drilling the wellbore with a drilling fluid and forming a filter cake over at least a portion of the wellbore. The wellbore servicing fluid (e.g., breaker fluid) can be utilized in/after a drilling operation. In such an aspect, a drilling fluid (e.g., drilling mud) is circulated through the wellbore while the wellbore is drilled. The drilling fluid can be circulated down through a conduit (e.g., a drill pipe) deposited in the wellbore and back up through an annular space between an outer surface of the conduit and a wellbore wall. As the drilling fluid is circulated through the wellbore, a portion of the drilling fluid can be deposited on a downhole surface (e.g., wellbore surface, formation surface, etc.) over at least a portion of the wellbore, thereby forming a filter cake. Presence of the filter cake may inhibit the loss of the drilling fluid or other fluids into the formation and may contribute to formation control and wellbore stability.

Concurrent with and/or subsequent to drilling operations where a filter cake is formed on the downhole surface (e.g., wellbore surface, formation surface, etc.), a wellbore servicing fluid of the type disclosed herein may be placed downhole and contacted with the filter cake to remove all or a portion of the filter cake. When the drilling fluid is an oil-based fluid, the wellbore servicing fluid further includes an emulsifier of the type disclosed herein. When desired (for example, upon reaching a desired depth), circulation of drilling fluid can be stopped, and the wellbore servicing fluid can be placed downhole via the conduit (e.g., a drill pipe) to contact the filter cake. in an aspect, the wellbore servicing fluid is placed (e.g., injected) into the wellbore and in contact with the filter cake therein by the same pumping system utilized to circulate drilling fluid through the wellbore during the drilling thereof. After the wellbore servicing fluid being placed downhole, the method may further include "pull out of the hole" (POOH) procedures, in which the conduit and other downhole tools/equipment (e.g., drillstring, tubing string, wireline equipment, a measurement tool, a logging tool, etc.) are retrieved (e.g., pulled out) from the wellbore to a surface of the wellbore. In an aspect, the method further includes closing a fluid isolation valve above a portion of the wellbore where the wellbore servicing fluid (e.g., breaker fluid) has been placed. The closing of the fluid isolation valve can avoid communication of fluids above and below the fluid isolation valve so that the wellbore is in a "shut-in" state (e.g., shut in the wellbore for a time sufficient to allow the sterically-hindered ester to hydrolyze).

In an aspect, the method further includes allowing the sterically-hindered ester to hydrolyze to form a carboxylic acid and allowing the carboxylic acid to remove all or a portion of the filter cake. In an aspect, when a sufficient quantity of the wellbore servicing fluid has been placed within the wellbore, the wellbore servicing fluid may be allowed to remain in contact with the filter cake for a sufficient period of time (e.g., for a time range disclosed herein) such that the sterically-hindered ester within the wellbore servicing fluid will hydrolyze to generate a sufficient quantity of the carboxylic acid to remove all or a portion of the filter cake. For example, in such an aspect, the wellbore servicing fluid may be allowed to remain in contact with the filter cake for a soak period, for example, for a period of time of at least about 1 hour, alternatively at least about 4 hours, alternatively at least about 8 hours, alternatively at least about 16 hours, alternatively at least about 24 hours, alternatively at least about 36 hours, alternatively at least about 48 hours, alternatively at least about 60 hours, alternatively at least about 72 hours, alternatively at least about 84 hours. In an aspect, during such a "soak period," the fluids within the wellbore may remain in a substantially static state, for example, as opposed to a dynamic state in which circulation may be present. In an aspect, the wellbore may be shut-in (e.g., by closing the fluid isolation valve) while the wellbore servicing fluid (e.g., breaker fluid) remains in contact with the filter cake (e.g., soaks the filter cake).

As noted previously, the sterically-hindered ester may be characterized as exhibiting a suitable delay period. The delay period may be adjusted to meet the needs of a process by adjusting the nature of the sterically-hindered ester used (e.g., compound type, amounts, etc.). The wellbore servicing fluid disclosed herein can result in removal of a filter cake in a time-delayed fashion so as to allow for efficient removal of the filter cake while minimizing damage to formation or equipment or to allow for other servicing operations. For example, a time delay in removing the filter cake may provide sufficient time for the wellbore servicing fluid to become fully and evenly distributed along a desired section of the wellbore. Such even treatment prevents isolated break-through zones in the filter cake (e.g., wormholing) that may undesirably divert subsequent servicing fluids placed downhole. Also, time delays in removing the filter cake may allow for subsequent servicing steps such as removing servicing tools (e.g., drill pipe, drillstring) from the wellbore. Following treatment with a wellbore servicing fluid of the type disclosed herein, further servicing operations may be performed (e.g., completion and/or production operations) as desired or appropriate, as for example in a hydrocarbon-producing well. In an aspect, a suitable flushing fluid or a spacer fluid is circulated through the wellbore to wash any remaining filter cake from the downhole surface. Generally, the flushing fluid utilized can be an aqueous solution which does not adversely affect the permeability of the formation. Thus, the flushing fluid may be an aqueous solution containing a relative permeability modifier.

In an aspect, when desired (for example, upon the cessation of drilling operations and/or upon reaching a desired depth), the wellbore or a portion thereof may be prepared for completion. In completing the wellbore, it may be desirable to remove all or a substantial portion of the filter cake from the downhole surface (e.g., walls of the wellbore and/or the subterranean formation). A wellbore servicing fluid of the type disclosed herein (e.g., breaker fluid) can be placed into the wellbore for removing all or a portion of the filter cake.

In an aspect, a method of servicing a wellbore penetrating a subterranean formation includes placing a wellbore servicing fluid (e.g., breaker fluid) of the type described herein into the wellbore. The wellbore servicing fluid can include an aqueous fluid and a sterically-hindered ester, which can be methyl hydroxypivalate (MHP), ethyl hydroxypivalate, isopropyl hydroxypivalate, isobutyl hydroxypivalate, t-butyl hydroxypivalate, isopropyl lactate, isobutyl lactate, t-butyl lactate, methyl 2-hydroxy-2-methylpropanoate, ethyl 2-hydroxy-2-methylpropanoate, isopropyl 2-hydroxy-2-methylpropanoate, isobutyl 2-hydroxy-2-methylpropanoate, t-butyl 2-hydroxy-2-methylpropanoate, hydroxypivalyl hydroxypivalate, or combinations thereof. The method can further include allowing the sterically-hindered ester to hydrolyze to form a carboxylic acid, which can remove all or a portion of a filter cake in the wellbore.

Various benefits may be realized by utilization of the presently disclosed methods and compositions. The sterically-hindered ester as disclosed herein shows high thermal stability resulting in hydrolysis which occurs in a delayed fashion as a function of temperatures. The steric effect can be introduced by the carboxylic acid, the alcohol, or both, and affords flexibility in producing a suitable delay period. By incorporating the sterically-hindered ester, the wellbore servicing fluid can provide extended delay of the release of the carboxylic acid at temperatures up to about 400° F. The wellbore servicing fluid of the disclosure does not require a viscosifier to effect the delayed release of the carboxylic acid at higher wellbore temperatures (e.g., 400° F.) which may cause further formation damage. In one or more aspects, the wellbore servicing fluid excludes a viscosifier, alternatively the wellbore servicing fluid excludes hydroxyethyl cellulose or derivatives thereof The methods and compositions of the present disclosure can benefit various operations (e.g., pull-out-of-the-hole (POOH) operation). With longer breakthrough time, the wellbore servicing fluid allows longer time to trip or pull out of the hole (POOH) and close the fluid isolation valve without losses to the formation, which allows the well control to be maintained. This especially benefits operations with increasing lengths of reservoir sections and complexity of lower completions at high temperature. Also, the disclosed methods and compositions can avoid a risk that loss may initiate before the reservoir section is isolated, which results in loss of reagent and incomplete filter cake removal. Besides filter cake removal, applications of the presently disclosed methods and compositions can include other subterranean applications that require delayed acid generation at high temperatures, such as reducing viscosity of hydraulic fluids, acid soluble cements, fluid loss pills, acidizing, etc.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

The presently disclosed compositions were used in breakthrough tests, in which methyl hydroxypivalate (MHP), a sterically-hindered ester of the type disclosed herein, was tested and compared to ethyl lactate and/or diacetin. Due to the two extra methyl groups present in MHP when compared to a lactate, MHP was expected to hydrolyze more slowly than lactates and thus acid release would be delayed longer. To run the break through test, a filter cake was first built on a ceramic disk with 20 micron pores by a drilling fluid having the formulation detailed in Table 1 at 250° F. for 4 hours; the filter cake and the ceramic disk were then soaked with a breaker fluid at 250° F. in a flow cell. Table 2 provides the formulation of the breaker fluid. The flow cell was pressurized to 200 psi on the top with a bottom valve of the flow cell open by a quarter turn. The weight of fluid coming out of the flow cell (through the filter cake and the ceramic disk) was recorded over time using a computer. When breakthrough occurred, the fluid started to come out quickly.

TABLE 1

Water-based drilling fluid

| | |
|---|---|
| Water, bbl | 0.874 |
| Salt, lb | 77 |
| Defoamer, lb | 0.2 |
| Viscosifier, lb | 1.25 |
| Fluid loss additive, lb | 6 |
| pH buffer, lb | 1 |
| Sized $CaCO_3$, 5 μ, lb | 20 |
| Sized $CaCO_3$, 25 μ, lb | 20 |

TABLE 2

Breaker fluid

| | #1 | #2 |
|---|---|---|
| 10.0 ppg brine, bbl | 0.827 | 0.809 |
| Soda ash, lb | 1.6 | 1.6 |
| Ethyl lactate, bbl | 0.173 | — |
| MHP, bbl | — | 0.191 |

Figure 2:
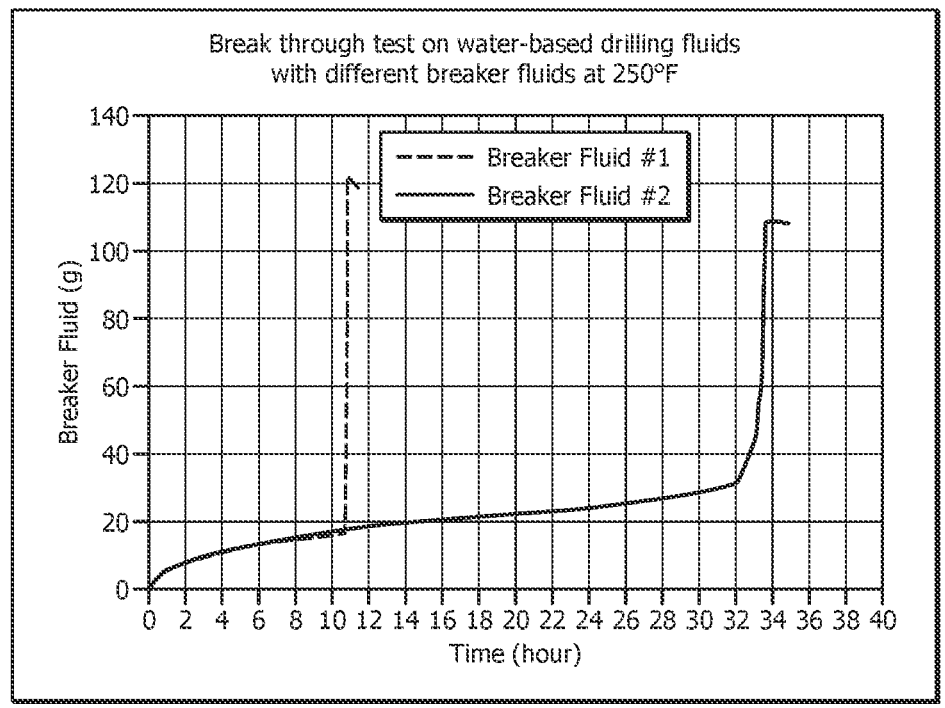
FIGS. 2 and 3 are graphs of breaker fluid volume as a function of time for the samples from Example 1.

Tables 1 and 2 show the formulation of the water-based drilling fluid and the breaker fluids (#1 and #2). Accordingly #2 breaker fluid was a wellbore servicing fluid of the type disclosed herein. The amount of each ester (ethyl lactate, MHP) was calculated so that they provided an equivalent amount of acid after hydrolysis. FIG. 2 shows the break through time when tested at 250° F. The results showed that the breaker fluid with MHP provided a longer break through time compared to the breaker fluid with ethyl lactate (32 hours versus 10 hours).

Figure 3:
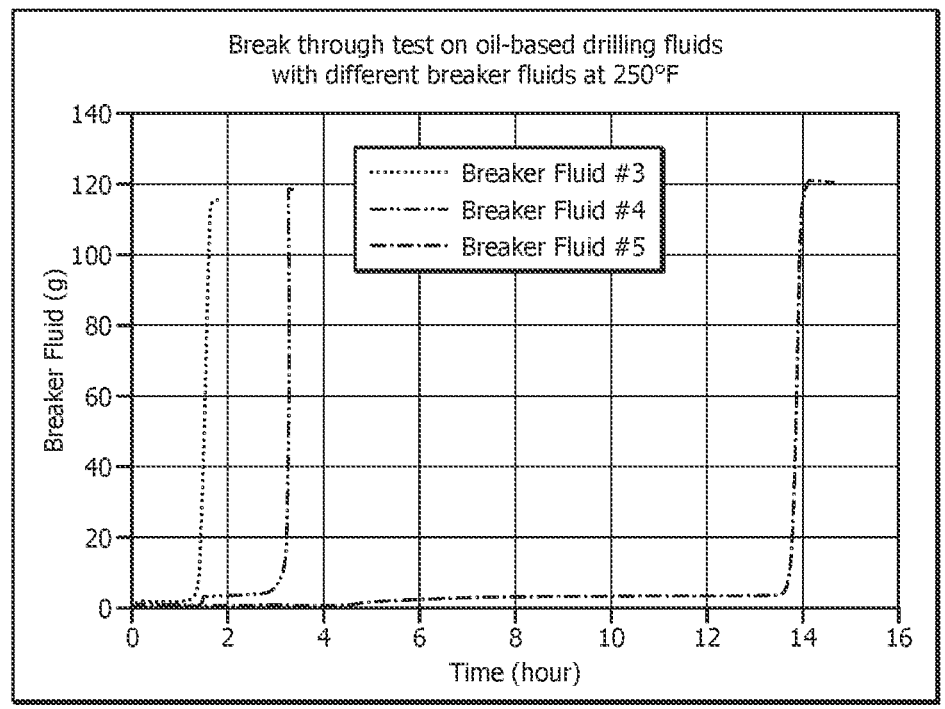

Additional break through tests were run with an oil-based drilling fluid, as shown in Tables 3 and 4 as well as FIG. 3. In addition to ethyl lactate and MHP, diacetin was also tested. #5 breaker fluid was a wellbore servicing fluid of the type disclosed herein. Acetic acid generated by the diacetin has similar acid strength as the hydroxypivalic acid generated by MHP; but without additional methyl groups, diacetin is expected to hydrolyze much faster than MHP, and also faster than ethyl lactate. The break through time shown in FIG. 3 reflected this trend, with a break through time of 1.2, 3.0, and 13.7 hours for breaker fluids containing diacetin, ethyl lactate, and MHP, respectively.

TABLE 3

Oil-based drilling fluid

| | |
|---|---|
| Base oil, bbl | 0.560 |
| Emulsifier 1, lb | 4.5 |
| Emulsifier 2, lb | 0.75 |
| Lime, lb | 7 |

TABLE 3-continued

Oil-based drilling fluid

| | |
|---|---|
| Fluid loss additive, lb | 2.5 |
| Salt, lb | 18.8 |
| Water, lb | 86.1 |
| Viscosifier, lb | 3.5 |
| Rheology modifier, lb | 0.5 |
| Sized $CaCO_3$, 5 μ, lb | 30 |
| Sized $CaCO_3$, fine, lb | 104.5 |

TABLE 4

Breaker fluid

| | #3 | #4 | #5 |
|---|---|---|---|
| 12.5 ppg brine, bbl | 0.336 | 0.373 | 0.373 |
| Water, bbl | 0.536 | 0.427 | 0.445 |
| Soda ash, lb | 1.6 | 1.6 | 1.6 |
| Diacetin, bbl | 0.118 | — | — |
| Ethyl lactate, bbl | — | 0.173 | — |
| MHP, bbl | — | — | 0.191 |
| Emulsifier, lb | 2.6 | 2.6 | 2.6 |

The above filter cake break through tests shown in FIGS. 2 and 3 demonstrated that the introduction of steric hindrance does slow down the hydrolysis of the esters, therefore provided delayed release of acids.

Additional Disclosure

The following are non-limiting, specific embodiments in accordance with the present disclosure:

A first embodiment, which is a method of servicing a wellbore penetrating a subterranean formation, comprising placing into the wellbore a wellbore servicing fluid comprising a sterically-hindered ester having a general formula $R^1COOR^2$ and an aqueous fluid, wherein $R^1$, $R^2$ or both have A-values greater than about 1.76 kcal/mol.

A second embodiment, which is the method of the first embodiment further comprising allowing the sterically-hindered ester to hydrolyze to form a carboxylic acid and an alcohol.

A third embodiment, which is the method of the second embodiment further comprising allowing the carboxylic acid to remove all or a portion of a filter cake in the wellbore.

A fourth embodiment, which is the method of any of the second and the third embodiments, wherein the sterically-hindered ester has a delay period of equal to or greater than about 1 hour to remove all or a portion of the filter cake after the placing.

A fifth embodiment, which is the method of any of the first through the fourth embodiments, wherein the wellbore has a bottom hole static temperature (BHST) in a range of from about 200° F. to about 400° F.

A sixth embodiment, which is the method of any of the second through the fifth embodiments, wherein the carboxylic acid has a general formula $R^1COOH$ and the alcohol has a general formula $R^2OH$, wherein (i) the carboxylic acid is a sterically-hindered carboxylic acid, (ii) the alcohol is a sterically-hindered alcohol, or both (i) and (ii).

A seventh embodiment, which is the method of the sixth embodiment, wherein $R^1$ in the sterically-hindered carboxylic acid has a general formula of $—CR^3R^4R^5$, wherein at least one of $R^3$, $R^4$, and $R^5$ is not hydrogen and $R^3$, $R^4$, and $R^5$ are independently selected from a group consisting of an organyl group having from about 1 to about 10 carbon atoms, a hydroxyl group, halogen, hydrogen, and an alkoxyl group.

An eighth embodiment, which is the method of any of the sixth and the seventh embodiments, wherein the sterically-hindered carboxylic acid comprises lactic acid, 2-hydroxy-2-methylpropoanoic acid, pivalic acid, 3-hydroxy-2,2-dimethylpropanoic acid (hydroxypivalic acid), or combinations thereof.

A ninth embodiment, which is the method of any of the sixth through the eighth embodiments, wherein $R^2$ in the sterically-hindered alcohol has a general formula of $-CR^6R^7R^8$ or $-CH_2CR^6R^7R^8$, wherein at least one of $R^6$, $R^7$, and $R^8$ is not hydrogen and $R^6$, $R^7$, and $R^8$ are independently selected from a group consisting of an organyl group having from about 1 to about 10 carbon atoms, a hydroxyl group, halogen, hydrogen, and an alkoxyl group.

A tenth embodiment, which is the method of any of the sixth through the ninth embodiments, wherein the sterically-hindered alcohol comprises isopropanol, isobutanol, t-butanol, neopentyl alcohol, 2,2-dimethylpropane-1,3-diol, 2-ethylpropane-1,2,3-triol, 2,3-dimethylbutane-2,3-diol, 2-(hydroxymethyl)-2-methylpropane-1,3-diol, pentaerythritol, or combinations thereof.

An eleventh embodiment, which is the method of any of the first through the tenth embodiments, wherein the sterically-hindered ester comprises methyl hydroxypivalate (MHP), ethyl hydroxypivalate, isopropyl hydroxypivalate, isobutyl hydroxypivalate, t-butyl hydroxypivalate, isopropyl lactate, isobutyl lactate, t-butyl lactate, methyl 2-hydroxy-2-methylpropanoate, ethyl 2-hydroxy-2-methylpropanoate, isopropyl 2-hydroxy-2-methylpropanoate, isobutyl 2-hydroxy-2-methylpropanoate, t-butyl 2-hydroxy-2-methylpropanoate, hydroxypivalyl hydroxypivalate, or combinations thereof.

A twelfth embodiment, which is the method of any of the first through the eleventh embodiments, wherein the sterically-hindered ester is present in the wellbore servicing fluid in an amount of from about 0.01 wt. % to about 50 wt. %, based on a total weight of the wellbore servicing fluid.

A thirteenth embodiment, which is the method of any of the first through the twelfth embodiments, wherein the aqueous fluid is selected from a group consisting of freshwater, saltwater, brine, seawater, and combinations thereof.

A fourteenth embodiment, which is the method of the thirteenth embodiment, wherein the brine comprises a salt including halide-containing salts, alkali metal salts, alkaline metal salts, formate-containing compounds, sodium bromide, calcium chloride, calcium bromide, sodium chloride, zinc bromide, sodium formate, cesium formate, potassium formate, or combinations thereof.

A fifteenth embodiment, which is the method of the fourteenth embodiment, wherein the salt is present in the brine in an amount of from about 1 wt. % to about 70 wt. % based on a total weight of the brine.

A sixteenth embodiment, which is the method of any of the first through the fifteenth embodiments, wherein the aqueous fluid is present in the wellbore servicing fluid in an amount of from about 50 wt. % to about 95 wt. %, based on a total weight of the wellbore servicing fluid.

A seventeenth embodiment, which is the method of any of the first through the sixteenth embodiments, wherein the wellbore servicing fluid further comprises an emulsifier.

An eighteenth embodiment, which is the method of the seventeenth embodiment, wherein the emulsifier comprises sodium phosphates, monoglycerides, diglycerides, sodium stearoyl lactylate, diacetyl tartaric acid esters of monoglycerides and diglycerides, emulsifying wax, polysorbate 20, polysorbate 40, polysorbate 60, polysorbate 80, ceteareth 20, ethoxylated alcohols, alkyl polyglycoside, dodecylbenzenesulfonate, ethylene oxide/propylene oxide copolymers (EO/PO copolymers), or combinations thereof A nineteenth embodiment, which is the method of any of the seventeenth and the eighteenth embodiments, wherein the emulsifier is present in an amount of from about 0.1 vol. % to about 5 vol. % based on a total volume of the wellbore servicing fluid.

A twentieth embodiment, which is the method of any of the first through the nineteenth embodiments, wherein the wellbore servicing fluid further comprises one or more additives.

A twenty-first embodiment, which is the method of the twentieth embodiment, wherein the one or more additives comprise an acid, a base, a defoamer, an expansion agent, a salt, a corrosion inhibitor, a mutual solvent, a conventional breaking agent, a relative permeability modifier, lime, a gelling agent, a crosslinker, a fluid loss control additive, a flocculant, a water softener, a proppant, an oxidation inhibitor, a thinner, a scavenger, a gas scavenger, a lubricant, a friction reducer, a bridging agent, a vitrified shale, a thixotropic agent, a dispersing agent, a weight reducing additive, a heavyweight additive, a surfactant, a scale inhibitor, a clay, a clay control agent, a clay stabilizer, a dispersant, a silicate-control agent, a biocide, a biostatic agent, a storage stabilizer, a filtration control additive, a suspending agent, a foaming agent, latex emulsions, a formation conditioning agent, elastomers, gas/fluid absorbing materials, resins, superabsorbers, mechanical property modifying additives, inert particulates, and the like, or combinations thereof A twenty-second embodiment, which is the method of any of the twentieth and the twenty-first embodiments, wherein the one or more additives are present in the wellbore servicing fluid in a total amount of from about 0.1 wt. % to about 10 wt. %, based on a total weight of the wellbore servicing fluid.

A twenty-third embodiment, which is the method of any of the first through the twenty-second embodiments, wherein the wellbore servicing fluid has a density of from about 8.5 pounds per gallon (ppg) to about 16 ppg.

A twenty-fourth embodiment, which is the method of any of the first through the twenty-third embodiments, wherein prior to the placing, the wellbore servicing fluid has a pH in a range of from about 7 to about 10.

A twenty-fifth embodiment, which is a method of servicing a wellbore penetrating a subterranean formation, comprising: drilling the wellbore with a drilling fluid; forming a filter cake over at least a portion of the wellbore; contacting the filter cake with a wellbore servicing fluid comprising a sterically-hindered ester having a general formula $R^1COOR^2$ and an aqueous fluid, wherein $R^1$, $R^2$ or both have A-values greater than about 1.76 kcal/mol; allowing the sterically-hindered ester to hydrolyze to form a carboxylic acid; and allowing the carboxylic acid to remove all or a portion of the filter cake.

A twenty-sixth embodiment, which is the method of the twenty-fifth embodiment, wherein the drilling fluid is an oil-based fluid and the wellbore servicing fluid further comprises an emulsifier.

A twenty-seventh embodiment, which is a method of servicing a wellbore penetrating a subterranean formation, comprising: placing into the wellbore a wellbore servicing fluid comprising an aqueous fluid and an ester comprising methyl hydroxypivalate (MTH)), ethyl hydroxypivalate, isopropyl hydroxypivalate, isobutyl hydroxypivalate, t-butyl hydroxypivalate, isopropyl lactate, isobutyl lactate, t-butyl lactate, methyl 2-hydroxy-2-methylpropanoate, ethyl 2-hydroxy-2-ethylpropanoate, isopropyl 2-hydroxy-2-methylpropanoate, isobutyl 2-hydroxy-2-methylpropanoate, t-butyl 2-hydroxy-2-methylpropanoate, hydroxypivalyl hydroxypivalate, or combinations thereof; allowing the ester to hydrolyze to form a carboxylic acid; and allowing the carboxylic acid to remove all or a portion of a filter cake in the wellbore.

A twenty-eighth embodiment, which is a wellbore servicing fluid comprising a sterically-hindered ester having a general formula $R^1COOR^2$ and an aqueous fluid, wherein $R^2$ or both have A-values greater than about 1.76 kcal/mol.

A twenty-ninth embodiment, which is the wellbore servicing fluid of the twenty-eighth embodiment, wherein the sterically-hindered ester hydrolyzes to form a carboxylic acid and an alcohol.

A thirtieth embodiment, which is the wellbore servicing fluid of the twenty-ninth embodiment, wherein the carboxylic acid has a general formula $R^1COOH$ and the alcohol has a general formula $R^2OH$, wherein (i) the carboxylic acid is a sterically-hindered carboxylic acid, (ii) the alcohol is a sterically-hindered alcohol, or both (i) and (ii).

A thirty-first embodiment, which is the wellbore servicing fluid of the thirtieth embodiment, wherein $R^1$ in the sterically-hindered carboxylic acid has a general formula of $—CR^3R^4R^5$, wherein at least one of $R^3$, $R^4$, and $R^5$ is not hydrogen and $R^3$, $R^4$, and $R^5$ are independently selected from a group consisting of an organyl group having from about 1 to about 10 carbon atoms, a hydroxyl group, halogen, hydrogen, and an alkoxyl group.

A thirty-second embodiment, which is the wellbore servicing fluid of any of the thirtieth and the thirty-first embodiments, wherein the sterically-hindered carboxylic acid comprises lactic acid, 2-hydroxy-2-methylpropanoic acid, pivalic acid, 3-hydroxy-2,2-dimethylpropanoic acid (hydroxypivalic acid), or combinations thereof.

A thirty-third embodiment, which is the wellbore servicing fluid of any of the thirtieth through the thirty-second embodiments, wherein $R^2$ in the sterically-hindered alcohol has a general formula of $—CR^6R^7R^8$ or $—CH_2CR^6R^7R^8$, wherein at least one of $R^6$, $R^7$, and $R^8$ is not hydrogen and $R^6$, $R^7$, and $R^8$ are independently selected from a group consisting of an organyl group having from about 1 to about 10 carbon atoms, a hydroxyl group, halogen, hydrogen, and an alkoxyl group.

A thirty-fourth embodiment, which is the wellbore servicing fluid of any of the thirtieth through the thirty-third embodiments, wherein the sterically-hindered alcohol comprises isopropanol, isobutanol, t-butanol, neopentyl alcohol, 2,2-dimethylpropane-1,3-diol, 2-methylpropane-1,2,3-triol, 2,3-dimethyl butane ,3-diol, 2-(hydroxymethyl)-2-methylpropane-diol, pentaerythritol, or combinations thereof.

A thirty-fifth embodiment, which is the wellbore servicing fluid of any of the twenty-eighth through the thirty-fourth embodiments, wherein the sterically-hindered ester comprises methyl hydroxypivalate (MI-IP), ethyl hydroxypivalate, isopropyl hydroxypivalate, isobutyl hydroxypivalate, t-butyl hydroxypivalate, isopropyl lactate, isobutyl lactate, t-butyl lactate, methyl 2-hydroxy-2-methylpropanoate, ethyl 2-hydroxy-2-methylpropanoate, isopropyl 2-hydroxy-2-methylpropanoate, isobutyl 2-hydroxy-2-methylpropanoate, t-butyl 2-hydroxy-2-methylpropanoate, hydroxypivalyl hydroxypivalate, or combinations thereof.

A thirty-sixth embodiment, which is the wellbore servicing fluid of any of the twenty-eighth through the thirty-fifth embodiments, wherein the sterically-hindered ester is present in the wellbore servicing fluid in an amount of from about 0.01 wt. % to about 50 wt. %, based on a total weight of the wellbore servicing fluid.

A thirty-seventh embodiment, which is the wellbore servicing fluid of any of the twenty-eighth through the thirty-sixth embodiments, wherein the aqueous fluid is selected from a group consisting of freshwater, saltwater, brine, seawater, and combinations thereof A thirty-eighth embodiment, which is the wellbore servicing fluid of the thirty-seventh embodiment, wherein the brine comprises a salt including halide-containing salts, alkali metal salts, alkaline metal salts, formate-containing compounds, sodium bromide, calcium chloride, calcium bromide, sodium chloride, zinc bromide, sodium formate, cesium formate, potassium formate, or combinations thereof.

A thirty-ninth embodiment, which is the wellbore servicing fluid of the thirty-eighth embodiment, wherein the salt is present in the brine in an amount of from about 1 wt. % to about 70 wt. % based on a total weight of the brine.

A fortieth embodiment, which is the wellbore servicing fluid of any of the twenty-eighth through the thirty-ninth embodiments, wherein the aqueous fluid is present in the wellbore servicing fluid in an amount of from about 50 wt. % to about 95 wt. %, based on a total weight of the wellbore servicing fluid.

A forty-first embodiment, which is the wellbore servicing fluid of any of the twenty-eighth through the fortieth embodiments, wherein the wellbore servicing fluid further comprises an emulsifier.

A forty-second embodiment, which is the wellbore servicing fluid of the forty-first embodiment, wherein the emulsifier comprises sodium phosphates, monoglycerides, diglycerides, sodium stearoyl lactylate, diacetyl tartaric acid esters of monoglycerides and diglycerides, emulsifying wax, polysorbate 20, polysorbate 40, polysorbate 60, polysorbate 80, ceteareth 20, ethoxylated alcohols, alkyl polyglycoside, dodecylbenzenesulfonate, ethylene oxide/propylene oxide copolymers (EO/PO copolymers), or combinations thereof A forty-third embodiment, which is the wellbore servicing fluid of any of the forty-first and the forty-second embodiments, wherein the emulsifier is present in an amount of from about 0.1 vol. % to about 5 vol. % based on a total volume of the wellbore servicing fluid.

A forty-fourth embodiment, which is the wellbore servicing fluid of any of the twenty-eighth through the forty-third embodiments, wherein the wellbore servicing fluid further comprises one or more additives.

A forty-fifth embodiment, which is the wellbore servicing fluid of the forty-fourth embodiment, wherein the one or more additives comprise an acid, a base, a defoamer, an expansion agent, a salt, a corrosion inhibitor, a mutual solvent, a conventional breaking agent, a relative permeability modifier, lime, a gelling agent, a crosslinker, a fluid loss control additive, a flocculant, a water softener, a proppant, an oxidation inhibitor, a thinner, a scavenger, a gas scavenger, a lubricant, a friction reducer, a bridging agent, a vitrified shale, a thixotropic agent, a dispersing agent, a weight reducing additive, a heavyweight additive, a surfactant, a scale inhibitor, a clay, a clay control agent, a clay stabilizer, a dispersant, a silicate-control agent, a biocide, a biostatic agent, a storage stabilizer, a filtration control additive, a suspending agent, a foaming agent, latex emulsions, a formation conditioning agent, elastomers, gas/fluid absorbing materials, resins, superabsorbers, mechanical property modifying additives, inert particulates, and the like, or combinations thereof.

A forty-sixth embodiment, which is the wellbore servicing fluid of any of the forty-fourth and the forty-fifth embodiments, wherein the one or more additives are present in the wellbore servicing fluid in a total amount of from about 0.1 wt. % to about 10 wt. %, based on a total weight of the wellbore servicing fluid.

A forty-seventh embodiment, which is the wellbore servicing fluid of any of the twenty-eighth through the forty-sixth embodiments, having a density of from about 8.5 pounds per gallon (ppg) to about 16 ppg.

A forty-eighth embodiment, which is the wellbore servicing fluid of any of the twenty-eighth through the forty-seventh embodiment, having a pH in a range of from about 7 to about 10.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of servicing a wellbore penetrating a subterranean formation, comprising:
    placing into the wellbore or the subterranean formation a wellbore servicing fluid comprising a sterically-hindered ester having a general formula $R^1COOR^2$ and an aqueous fluid; and
    allowing the sterically-hindered ester to hydrolyze to form a carboxylic acid and an alcohol, wherein the wellbore has a bottom hole static temperature (BHST) in a range of from about 200° F. to about 400° F., wherein the carboxylic acid has a general formula $R^1COOH$ and the alcohol has a general formula $R^2OH$, and wherein (i) the carboxylic acid is a sterically-hindered carboxylic acid, (ii) the alcohol is a sterically-hindered alcohol, or both (i) and (ii).

2. The method of claim 1, wherein $R^1$, $R^2$ or both have A-values greater than about 1.76 kcal/mol.

3. The method of claim 1, wherein the carboxylic acid acidizes a portion of the wellbore or subterranean formation.

4. The method of claim 1, wherein $R^1$ in the sterically-hindered carboxylic acid has a general formula of $—CR^3R^4R^5$, wherein at least one of $R^3$, $R^4$, and $R^5$ is not hydrogen and $R^3$, $R^4$, and $R^5$ are independently selected from a group consisting of an organyl group having from about 1 to about 10 carbon atoms, a hydroxyl group, halogen, hydrogen, and an alkoxyl group.

5. The method of claim 1, wherein $R^2$ in the sterically-hindered alcohol has a general formula of $—CR^6R^7R^8$ or $—CH_2CR^6R^7R^8$, wherein at least one of $R^6$, $R^7$, and $R^8$ is not hydrogen and $R^6$, $R^7$, and $R^8$ are independently selected from a group consisting of an organyl group having from about 1 to about 10 carbon atoms, a hydroxyl group, halogen, hydrogen, and an alkoxyl group.

6. The method of claim 1, wherein the sterically-hindered alcohol comprises isopropanol, isobutanol, t-butanol, neopentyl alcohol, 2,2-dimethylpropane-1,3-diol, 2-methylpropane-1,2,3-triol, 2,3-dimethylbutane-2,3-diol , 2-(hydroxymethyl)-2-methylpropane-1,3-diol, pentaerythritol, or combinations thereof.

7. The method of claim 1, wherein the sterically-hindered ester comprises methyl hydroxypivalate (MHP), ethyl hydroxypivalate, isopropyl hydroxypivalate, isobutyl hydroxypivalate, t-butyl hydroxypivalate, isopropyl lactate, isobutyl lactate, t-butyl lactate, methyl 2-hydroxy-2-methylpropanoate, ethyl 2-hydroxy-2-methylpropanoate, isopropyl 2-hydroxy-2-methylpropanoate, isobutyl 2-hydroxy-2-methylpropanoate, t-butyl 2-hydroxy-2-methylpropanoate, hydroxypivalyl hydroxypivalate, or combinations thereof.

8. The method of claim 1, wherein the sterically-hindered ester is present in the wellbore servicing fluid in an amount of from about 0.01 wt. % to about 50 wt. %, based on a total weight of the wellbore servicing fluid.

9. The method of claim 1, wherein the wellbore servicing fluid has a density of from about 8.5 pounds per gallon (ppg) to about 16 ppg.

10. The method of claim 1 wherein prior to the placing, the wellbore servicing fluid has a pH in a range of from about 7 to about 10.

11. The method of claim 1, wherein the carboxylic acid reduces a viscosity of a hydraulic fracturing fluid present in the wellbore or subterranean formation.

12. The method of claim 1, wherein the carboxylic acid solubilizes an acid soluble cement present in the wellbore or subterranean formation.

13. The method of claim 1, wherein the carboxylic acid contacts a fluid loss pill present in the wellbore or subterranean formation.

14. The method of claim 1, wherein the sterically-hindered ester forms the carboxylic acid equal to or greater than 1 hour after the placing into the wellbore.

15. The method of claim 14, wherein $R^1$, $R^2$ or both have A-values greater than about 1.76 kcal/mol.

16. The method of claim 1, wherein the sterically-hindered carboxylic acid comprises lactic acid, 2-hydroxy-2-methylpropanoic acid, pivalic acid, 3-hydroxy-2,2-dimethylpropanoic acid (hydroxypivalic acid), or combinations thereof.

17. The method of claim 8, wherein the sterically-hindered alcohol comprises isopropanol, isobutanol, t-butanol, neopentyl alcohol, 2,2-dimethylpropane-1,3-diol, 2-methylpropane-1,2,3-triol, 2,3-dimethylbutane-2,3-diol, 2-(hydroxymethyl)-2-methylpropane-1,3-diol, pentaerythritol, or combinations thereof.

18. The method of claim 1, wherein the wellbore servicing fluid further comprises an emulsifier.

19. The method of claim 18, wherein the emulsifier comprises sodium phosphates, monoglycerides, diglycerides, sodium stearoyl lactylate, diacetyl tartaric acid esters of monoglycerides and diglycerides, emulsifying wax, polysorbate 20, polysorbate 40, polysorbate 60, polysorbate 80, ceteareth 20, ethoxylated alcohols, alkyl polyglycoside, dodecylbenzenesulfonate, ethylene oxide/propylene oxide copolymers (EO/PO copolymers), or combinations thereof.

20. The method of claim 18 wherein the emulsifier is present in an amount of from about 0.1 vol. % to about 5 vol. % based on a total volume of the wellbore servicing fluid.

* * * * *